United States Patent [19]

Vilips et al.

[11] 3,783,194

[45] Jan. 1, 1974

[54] DATA MODEM HAVING A FAST TURN-AROUND TIME OVER DIRECT DISTANCE DIALED NETWORKS

[75] Inventors: Viesturs Valentins Vilips; Joseph Lowey, both of Miami Lakes; Paul E. Payne, Fort Lauderdale, all of Fla.

[73] Assignee: Milgo Electronic Corporation, Miami, Fla.

[22] Filed: Nov. 20, 1972

[21] Appl. No.: 308,286

[52] U.S. Cl. ........... 179/2 DP, 178/66 R, 179/170.2

[51] Int. Cl. .......................................... H04m 11/06

[58] Field of Search ....................... 179/2 DP, 170.2, 179/170.4, 170.6; 178/66 R

[56] References Cited

UNITED STATES PATENTS

| | | | |
|---|---|---|---|
| 3,305,635 | 2/1967 | Kadis | 179/2 DP |
| 3,069,501 | 12/1962 | Gilman | 179/170.2 |
| 3,647,993 | 3/1972 | Foulkes | 179/2 DP |
| 3,436,487 | 4/1969 | Blane | 179/2 DP |
| 3,170,994 | 2/1965 | Benewicz | 179/170.2 |
| 3,183,313 | 5/1965 | Cutler | 179/170.4 |
| 2,041,101 | 5/1936 | Wright | 179/170.4 |

*Primary Examiner*—Kathleen H. Claffy
*Assistant Examiner*—Thomas D'Amico
*Attorney*—Harold L. Jackson et al.

[57] ABSTRACT

This invention relates to data communication over networks employing echo suppressors. The invention generates a tone to initially disable the echo suppressors, thereafter whenever the network is free of data a tone generator is enabled to supply a signal at a frequency outside the frequency range of data transmission to keep the echo suppressors disabled during the absence of data transfer in either direction thereby effecting a data transmission system with a reduced turn around time.

18 Claims, 4 Drawing Figures

DATA MODEM HAVING A FAST TURN-AROUND TIME OVER DIRECT DISTANCE DIALED NETWORKS

BACKGROUND OF THE INVENTION

1. Field of the Invention

The field of this invention includes communication systems for transferring digital data and particularly includes such communication systems employing direct distance dialed networks as selected on a random basis through telephone company central offices, long distance trunk circuits, and the like.

2. Description of the Prior Art

Direct distance dialing (DDD) networks today are being utilized to a significant degree for transmission of digital data. Such networks, however, were designed originally for voice communication. The telephone companies adapt different amounts of amplification in the DDD network to meet a user's requirements. For example, if local telephone communication is to take place over a pair of wires which handle both direction of voice signal flow for distances of beyond a few miles, simple negative resistance type repeaters are used.

When long distance voice communication is involved, however, the telephone company introduces large amounts of needed amplification in a pair of separate two wire uni-directional paths. In such pairs, one each of the two wire paths are used for one direction only of voice signal flow. The conversion between a two wire/two way circuit found at a subscriber location and a pair of two wire/one way circuits normally found between central offices requires the use of a pair of two-to-four wire hybrids at each end of the four wire signal paths. If perfect hybrid circuits were available, there would be a condition of perfect balance so that no transmission would occur from the output of a receiving line to the input of the sending line on any hybrid pair.

In actual practice, however, the telephone switching offices connect to a large variety of trunks and subscriber lines which make it impossible to achieve anywhere near perfect balance. As a result, there is always some small amount of signal which passes back over the four-wire path and becomes an echo signal. If the circuits are long, the echo returns to the sending end sufficiently delayed that it gives the impression of interrupting the talker's speech. This signal is referred to as a "talker echo." In those instances when both hybrids of a four-wire loop have poor balance, signals can pass completely around the loop; and, thus, appear as an echo at the receiving end. This type of signal is called a "listener echo."

In order to avoid these undesirable echoes, DDD networks employ echo suppressors. Echo suppressors are placed in the four-wire circuit comprised of a pair of two wire/one way lines and, unless disabled, allow a signal to pass in one direction only on any one of the two-wire pairs. Echoes are prevented by simultaneously providing a low impedance in one two-wire pair of the four-wire circuit while a high impedance is inserted in the other pair of lines of the loop formed by the four-wire circuit and the two hybrids, thus effectively blocking the echo path.

In the normal operation, when a speaker pauses for a reply from the listener, an echo suppressor senses the pause and also senses the signal generated from the opposite direction by the responding speaker. The signal which is generated by the reply causes the echo suppressor to "turn-around" and pass the signal only in the direction from the responding speaker to the listener. The turn-around time of echo suppressors is normally in the order of 100 milliseconds.

The 100 millisecond turn-around time does not affect voice communications. In dramatic contradistinction, however, the turn-around time is of considerable significance when high speed data is being transmitted over DDD networks. In order to appreciate the significance of the present invention, the background prior art circuitry of FIG. 1 will be described in detail hereinafter. Suffice it to say at this point that the turn-around time of this invention is extremely short. Accordingly, more data throughput from one station to another over a DDD network is possible in a more efficient manner.

To appreciate the low data throughput caused by the long turn-around time each time the data transmission direction is reversed, one need only consider the type of data terminal equipment generally utilized in digital data communication systems. In many instances the transmitting data terminal equipment requires the receiving data terminal equipment to acknowledge the receipt of each data block and inform the sending terminal if it contained any errors or not. Because of this requirement, the data transmission direction in the path must be turned around twice for each data block transmitted, i.e., it must be turned around once to send back a reply and turned around once again before the next data block can be sent. This requirement is true whether the data block is received error free or whether it includes errors. If the received block includes errors, the receiving unit must notify the transmitting unit to re-transmit the original data block.

Although the general requirements are true in most digital data communication systems. It is particularly true for interactive digital communications systems operating over a two-wire, end-to-end connection made through the DDD network where data must be sent alternately in both directions which make impractical the use of other error correction methods such as automatic request for repetition, or forward acting error correction codes, and the like. In such instances, the turn-around time reduces the amount of throughput to an unacceptable level even when high speed data modems are utilized. In order to avoid degradation in data throughput, some sophisticated data terminal equipment employs "interleaving." In "interleaving," a reply to the data block received from station A is interleaved with a data block sent from station B to point A and conversely. Even with such interleaving, however, a two wire/half duplex communication path must still be turned around twice for the transmission of every two consecutive interleaved reply/data blocks.

A formula together with a definition of various signalling terms involved in the total turn around delay for conventional modem operations and for the modems incorporating this invention will be described in more detail hereinafter. It is sufficient to note at this point that the excessive length of the turn-around delay, although completely acceptable for voice communication, is totally undesirable for high speed data transmission over DDD networks but was unavoidable prior to the advent of this invention.

SUMMARY OF THE INVENTION

Modems incorporating this invention overcome the foregoing problems by significantly reducing the turn-around time in that a clear-to-send (CTS) delay of approximately 10 milliseconds at an exemplitive data rate of 2400 bits per second is provided; rather than providing a 150 millisecond CTS delay time required by similar conventional modems when they are used over a two wire connection made through the DDD network. This extremely short CTS delay time enables data flow reversal on a two wire/half duplex line almost as fast as when a four-wire circuit is operated in a half-duplex mode. The fast turn-around time achieved by modems incorporating this invention, insures the modem and data terminal equipment operation is more efficient for customers. The short turn-around time capability of this invention is accomplished by selectively initiating and maintaining a network control signal tone from either one or both ends of a connection established through a DDD network in such a manner that the echo suppressors remain continuously disabled irrespective of the direction of data transfer until the DDD network connection is broken.

Figure 1:
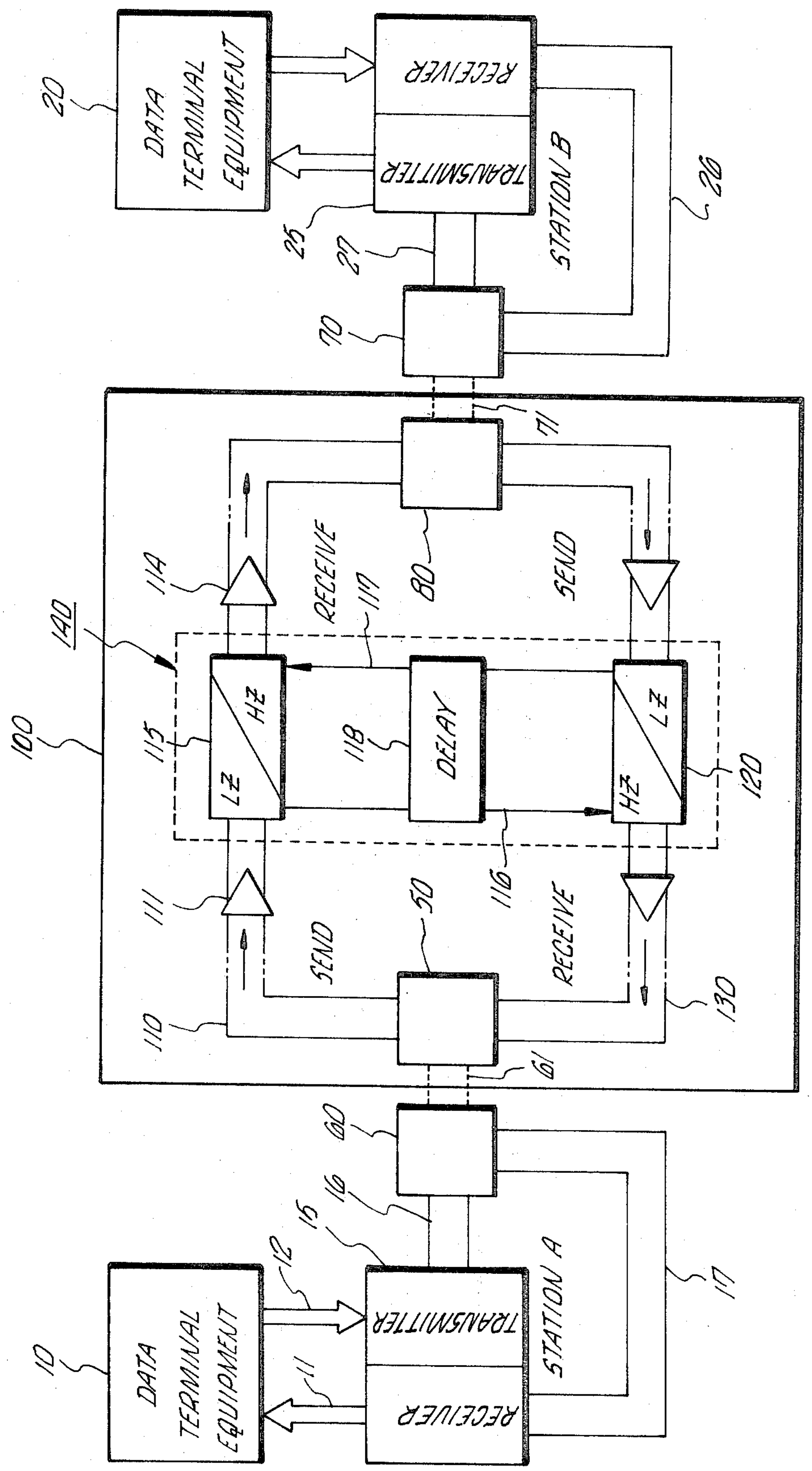
FIG. 1 is a drawing of a prior art communication system involving conventional modems operating in a two wire/half duplex mode.

DESCRIPTION OF THE PREFERRED EMBODIMENT:

Turning now to the drawings, the background of the prior art system of FIG. 1 will be considered in detail prior to a consideration of the features of this invention.

A pair of conventional modems 15 and 25, which require approximately 150 milliseconds clear-to-send delay time before the direction of high speed data transfer is reversed, are shown connected between data terminal equipment 10, 20 and DDD network 100. It should be noted, as an aside, that if calls were routed through the DDD network 100 on a selected basis, there could be instances in which no echo suppressors would be present. However, the routing of long distance calls through a DDD network 100 is on a completely random basis and it is, therefore, impossible to predict which circuits will contain echo suppressors. A typical pair of two wire/one way lines of a transmission loop which includes one echo suppressor 140, is shown in DDD network 100. It should be understood, of course, that many four-wire networks each with its own echo suppressor may be present in a DDD network 100 depending upon the routing of any given call.

Assume, at station A, that the data terminal equipment (DTE) 10 has been properly interfaced with data modem 15; and, in a similar manner, at station B, another DTE 20 has been properly interfaced with modem 25. No consideration is given at this time to the manner in which the paths between data modem 15 and data modem 25 have been established. It is merely assumed that such calls have been completed through DDD network 100 in a manner which is described in more detail hereinafter.

Each modem includes a transmit and a receive portion. Each modem transmitter and modem receiver is connected by a pair of wires 16, 17 and 26, 27 for modems 15 and 25 respectively to a pair of two-to-four wire hybrids 60 and 70 respectively. Hybrid 60 includes a two-wire path 61 to another hybrid 50 within DDD network 100, and hybrid 70 is connected by a two-wire path 71 to hybrid 80 in DDD network 100.

An upper two wire/one way circuit 110 in DDD network 100 includes a send side at the signal terminals of hybrid 50 and a receive side at the terminals of hybrid 80. Connected in the two wire/one way path 110 are a pair of amplifiers 111, 114 and unit 115 of the echo suppressor 140. When signals are being sent from modem 15 at station A to modem 25 at station B, the echo suppressor unit 115 provides a low impedance path through it for signals on the two-wire line 110.

A low impedance condition for echo suppressor unit 115 is represented by the letter designation LZ. In accordance with conventional echo suppressor operation, the establishment of echo suppressor unit 15 in a low impedance condition results in echo suppressor unit 120 assuming a high impedance condition. This high impedance condition is represented by the designation HZ. The reverse impedance condition is, of course, true for data transmission in the opposite direction, i.e., from station B to station A.

Assume that it is desired to immediately reverse the roles of modems 15 and 25 at station A and B respectively. Data will then be transmitted from modem 25 at station B to modem 15 at station A. Such a reversal in signal direction requires at least 100 milliseconds of allotted time for the impedance conditions in units 115 and 120 of echo suppressor 140 to reverse. This reversal is diagramatically depicted by arrows 116, 117 and delay 118; understanding of course, that arrows 116, 117 and delay 118 are not actual components. Rather, these items simply represent an inherent operational requirement for reversing impedance directions of units 115 and 120 of the echo suppressor 140.

Conventional modems, in the past, extend the amount of turn-around time to approximately 150 milliseconds each time the data transfer direction is reversed. This additional time of approximately 50 milliseconds over the time required for the suppressor to turn-around, is needed because of allowance for tolerances in practical circuits used in the echo suppressors and various other time delay circuits which are present in every modem.

Path 130, after turn-around is completed, is in a low impedance condition due to unit 120 of echo suppressor 140 being in low impedance condition, and data transmission path 110 is in a high impedance condition due to unit 115 of echo suppressor 140 being in a high impedance condition. With the echo suppressor 140 in the impedance condition just described, modem 25 at station B can now transmit data through path 130 to modem 15 at station A. The total 150 millisecond turn-around time is a controlling factor in the assignment of start and stop times for the various interface signals between a data terminal equipment device 10 and a modem such as modem 15.

Arrows 11 and 12 between DTE 10 and modem 15 symbolically represent a number of given interface signals which are employed in modem operation over DDD networks. In this same regard, the associated equipment which is required to establish a completed path between a called and a calling station over DDD networks is another factor to be considered. Various data access arrangements (DAA) are available for converting standard telephone sets at a subscriber location into an integral part of the entire communication system for transmitting high speed data using modems over DDD networks. Modems utilizing this invention are capable of cooperation with any one of the various DAA units which are available on the market.

Numerous patents and other publications describe in detail the manner in which a calling station reaches a called station and vice versa. As a typical example, a normal telephone set operable in conjunction with a DAA of a particular type is described in Stoffels U.S. Pat. No. RE 26,099. The Stoffels patent may be reviewed if full details for establishment of a completed path through a communication system is desired. Briefly, however, a DAA and its associated modem are provided with transmitting oscillators emitting a particular tone and a tone receiver in an automatic calling unit which responds to the receipt of a particular tone to accomplish certain switching operations. Briefly, a communication link for data terminal equipment 10 and modem 15 at station A through DDD 100 to data terminal equipment 20 and modem 25 at station B, first requires a calling station to ring the called number in any conventional and well-known manner. When the called number answers the ring, either an operator or an automatic device at the called station transmits a selected network control signal tone from the called station through the DDD network back to the calling station. The network control signal tone is hereinafter referred to as the "answer tone". This "answer" tone, transmitted by the called station in response to a detected ring signal, is of sufficient duration to disable any echo suppressor which may be contained in the DDD network path between the two modems. However, the disabled echo suppressors will become enabled again some 50 milliseconds after the answer tone ceases, unless some signal energy is transmitted by the modem, at either end of the circuit, as soon as answer tone transmission ceases. While all echo suppressors are disabled, non-overlapping signals can be transmitted over the two wire connection made through the DDD network from station A to station B.

The description of the conventional modem operation to this point has assumed that a modem is going to transmit information in one direction only at a time. There are several modems on the market today, however, that transmit information in two directions simultaneously over a two wire/half duplex circuit. Typical of such modems is a modem designated modem 3300 equipped with a slow speed reverse direction channel, and manufactured and sold by the assignee of this invention. The designated modem can operate at either 2400 or 3600 bits per second for transmitting main high speed channel data via a modulated carrier signal which occupies most but not all of the usable bandwidth of the telephone line. Sufficient bandwidth in the lower portion of the telephone band (approximately 300 to 600 cycles) is available to provide what is known in the art as a "reverse channel." Such reverse channel can be used to transmit low speed data simultaneously in a direction opposite to that of the primary high speed data. For example, in the identified modem, the reverse channel operates at a data speed of 150 bits per second. When such a modem is used for operation over a two wire/half duplex circuit, the echo suppressors in the DDD network must be disabled in order to transmit data in both directions simultaneously.

most of the elements shown in block diagram form in the figures of this application are well known in the data transmission art. Numerous circuits are readily available to perform the operations as described herein. To the extent that knowledge of further detailed circuitry is desired, reference may be made to the installation manual of the above-identified modem 3300.

The features of our invention will now be described in light of the prior art description and with reference to FIG. 2. In line 1 of FIG. 2, the answer tone which has a frequency of either 2025 HZ or 2225 Hz is depicted being emitted from called modem 25 in response to a ring detect at that modem. The answer tone only is transmitted on the line from called station B for approximately one-half to one second prior to start of any data transmission. Its transmission over DDD network 100 disables all of the echo suppressors such as echo suppressor 140.

After sending answer tone over DDD network 100, modem 25 advises DTE 20 that a connection has been established from the calling station. This connection for data is indicated by a data set ready signal (DSR) applied to DTE 20 (see FIG. 2). At the other end of the communication path, the calling station also connects its modem to the data communications path established and provides a DSR signal to its data terminal equipment 10 after it detects the answer tone transmitted by the called station. At the calling station, the detection of answer tone and connection of the modem to the line can be done either manually by the operator or by an automatic calling unit (ACU). A DSR signal, in and of itself, it not sufficient for either DTE to transfer data to its modem as further control signal interchanges between the modem and its associated DTE are required. Modems 15 and 25 await control signals from and are under further control of their associated DTE's after presenting a DSR signal to the associated DTE.

A feature of this invention is that an additional network control tone called a residual tone is applied to DDD network 100 substantially concurrently with the ending of the answer tone. Thus, as shown in FIG. 2, at time $T_0$ a residual tone 216 is applied to the DDD network 100. This residual tone is not received or utilized by either modem for its operation or transmission of data. Instead, it provides signal energy on the lines through DDD network 100, which signal energy is continually supplied whenever data is not being sent for the exclusive purpose of keeping the echo suppressors disabled. Accordingly, our invention maintains the echo suppressors in DDD network 100 disabled and thus allows modems utilizing this invention to have an extremely short turn-around time, as is explained in greater detail following a description of certain further interface signals and the description of TBLE I hereinafter.

In accordance with standardized data transmission operation procedures, the DTE that first initiated the call also determines the direction of initial data transmission through DDD network 100. In order to initiate data transmission, the DTE employs a control signal line for presenting a request-to-send (RTS) signal to its associated modem. If, for example, modem 25 is not receiving any primary high speed data channel signals transmitted over the two wire/half duplex communications circuit made through the DDD network, then DTE 20 can raise its RTS control signal. In response to an RTS signal from DTE 20, modem 25, in conventional operation, must wait approximately 150 milliseconds before returning to DTE 20 a "clear-to-send" (CTS) control signal. The 150 milliseconds between the RTS and CTS signal represents the CTS delay ($D_{cts}$) which is the most significant part of the total turn-around time whenever the direction of data transfer is to be reversed by conventional modems operating over a two wire/half duplex network. This total turn-around time (TTAD) may be expressed in the manner shown in Table I.

TABLE I $$TTAD = 2(D_{cts} + D_p + D_m) + D_r + T_{ack} + D_t$$

Where:

$D_{cts}$ = Delay of "Clear-to-send" signal from the modem, in response to the "Request-to-Send" signal from the data terminal. For conventional modems used on DDD network this time is about 150 to 220 milliseconds.

($2 \times D_{cts}$ = 300 to 440 milliseconds.)

$D_p$ = One-way signal propagation (absolute) delay. This delay typically ranges from 2 to 15 milliseconds, depending on length of the connection made through the DDD network.

$D_m$ = One-way signal propagation delay through the modem transmitter and receiver, as a pair. This delay can range from 3 to 15 milliseconds depending on modem design.

$D_r$ = Reaction time of the receiving data terminal equipment to respond with a "Request-to-Send" signal to send a reply for the data block received. This delay is usually a few milliseconds, but can be longer depending on terminal and software design.

$T_{ack}$ = Time needed for the data terminal equipment to send a reply at the modem bit rate. The reply usually consists of 4 to 7 characters, each 6 to 10 bits.

$D_t$ = Reaction time of the transmitting data terminal equipment or CPU to evaluate the reply from the receiving terminal and issue "Request-to-send" signal for transmission of the next data block. This usually is a few milliseconds.

Typical TTAD for a high-speed data communications system using conventional modems and operating at 2400 bps is:

TTAD = 2(150 + 10 + 5) + 5 + 10 + 2 = 347 milliseconds

As can be seen from the above, the term $D_{cts}$ (Clear-to-Send delay) causes most of the turn-around delay. The long CTS delay is needed to permit echo suppressors to turn around each time the direction of data flow is reversed when conventional modems are used.

Figure 3:
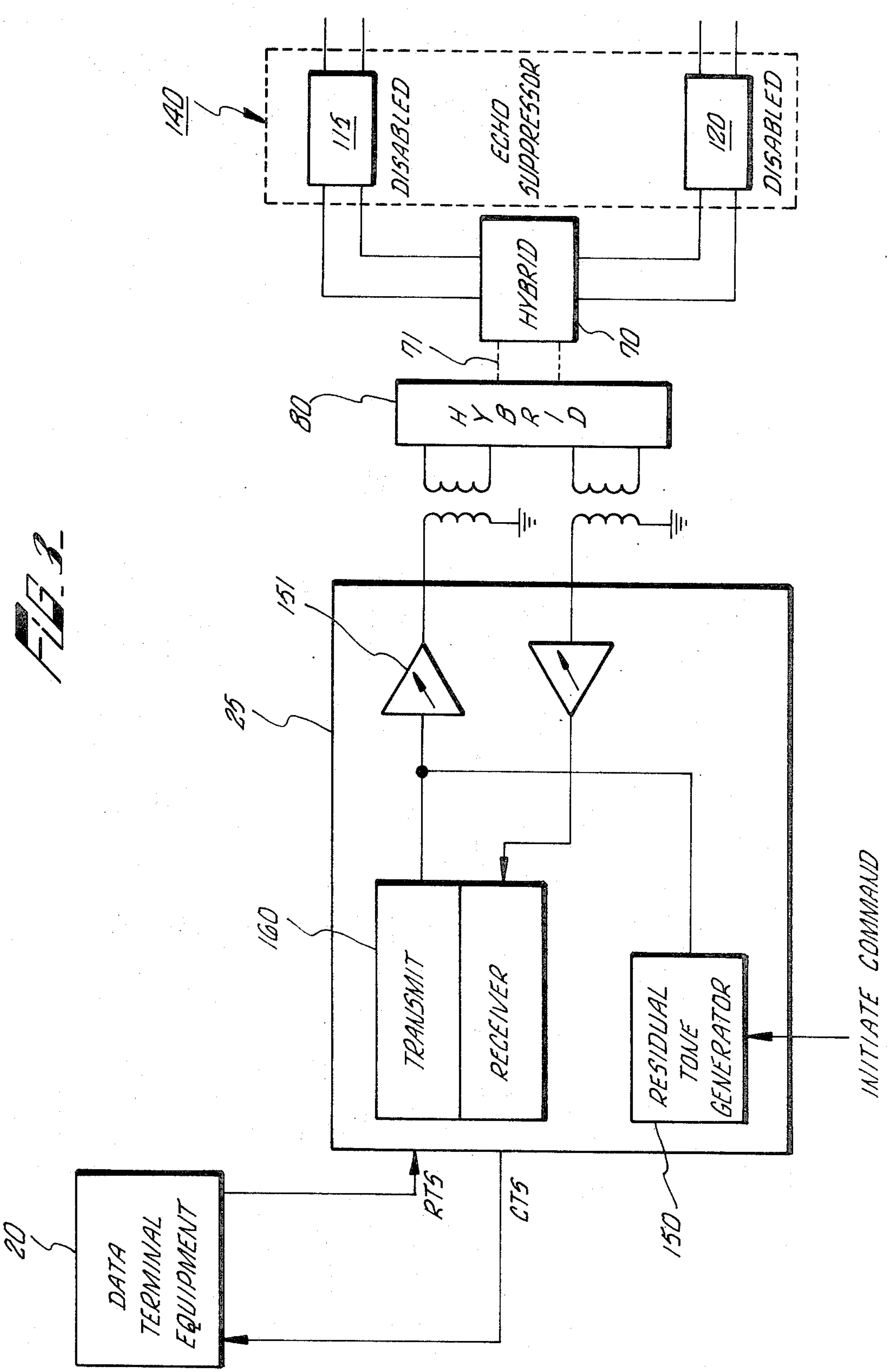
FIG. 3 depicts a transmitter and a receiver of the improved modem utilizing this invention depicted in block diagram form.

Turning now to the present invention, a generalized block diagram of a modem incorporating our invention is shown in FIG. 3. FIG. 3 sets forth the basic elements necessary to perform the broad aspects of our invention. In FIG. 3 a residual network control signal tone generator 150 is shown responsive to an initiate command. That initiate command may be applied manually by an operator, or it may be applied automatically by well known logic operations as described hereinafter with reference to FIG. 4.

The output of the residual network control signal tone generator 150 is connected to the input of a transmitting amplifier 151. The transmitting amplifier 151 may be any variable gain amplifier as is commonly found in modems. The frequency of the residual tone is selected to be outside of the bandwidth required for the transmission of information by transmit portion 160 of modem 25. As described earlier, units 115 and 120 of echo suppressor 140 may be maintained in a disabled condition by continuously transmitting signal energy over DDD network 100 immediately after answer tone 215, FIG. 2 ceases. Such signal energy may be transmitted through DDD network 100 from either one end or from both ends of the DDD network 100. For greater assurance, we have found it is advantageous in our invention to utilize residual tone generators at both modems 15 and 25. Accordingly, output signals such as 216, FIG. 2, from a residual tone generator 150 through amplifier 151 at modem 25 keeps units 115 and 120 of echo suppressor 140 disabled. Another similar unit at modem 15 assures continuous signal energy is present without any interruptions exceeding 50 milliseconds. This signal energy is present, of course, even if the main carrier signal transmission is momentarily interrupted by line faults or the like.

An output from residual tone generator 150 can be on continuously whether the modem 25 is transmitting data (main carrier) or not. As an alternative, the output from the residual tone generator 150 can also be emitted only when the RTS level from a DTE is false, and while an answer tone is not being emitted.

Similar control conditions exist for the other residual tone generator at modem 15 at the other end of the two wire/half duplex connection made through DDD network 100. Because such residual tones 216, FIG. 2, are not received nor utilized by a receiving modem these residual tones 216 can be continually applied from either or both ends of the DDD network 100 so as to assure continued disablement of both units 115 and 120 of echo suppressor 140 irrespective of which modem is transmitting or receiving data. A residual tone 216 can also be applied from either or both ends of the DDD network 100 while the RTS signal 218, FIG. 2, applied to the modem is at a logic false level as shown in FIG. 2. Other than this stated network control function, residual tones 216 serve no useful purpose and are void of any function with reference to a receiving modem. Because such tones are not received by a modem the residual tone is distinguished from reverse channel tones mentioned earlier. Such reverse channel tones are modulated with data and are inherently subject to receive filter and detector delays in the order of 150 to 200 milliseconds in conventional modems. Thus, this delay period must be provided for in conventional modems before data transmitted over the slow speed channel can be reversed in direction. In our invention, these delays of the prior art modem may be safely ignored and provide a vastly improved system.

A review of the formula set forth in Table I, clearly that shows the major factor in the total turn-around delay time is $D_{cts}$, the time between RTS going true and the CTS level going true. Employment of a residual network control signal tone generator 150 in modems at both ends of the DDD network 100 results in a drastic reduction in $D_{cts}$. Thus, the total turn-around time between two consecutive data blocks transmitted by our invention is in the order of 70 milliseconds, rather than in the order of 350 milliseconds required when conventional modems are used. As a result, data communication systems incorporating this invention, achieve a significant amount of data throughput when operated over two-wire DDD networks as compared with lower data throughput of conventional systems.

Figure 4:
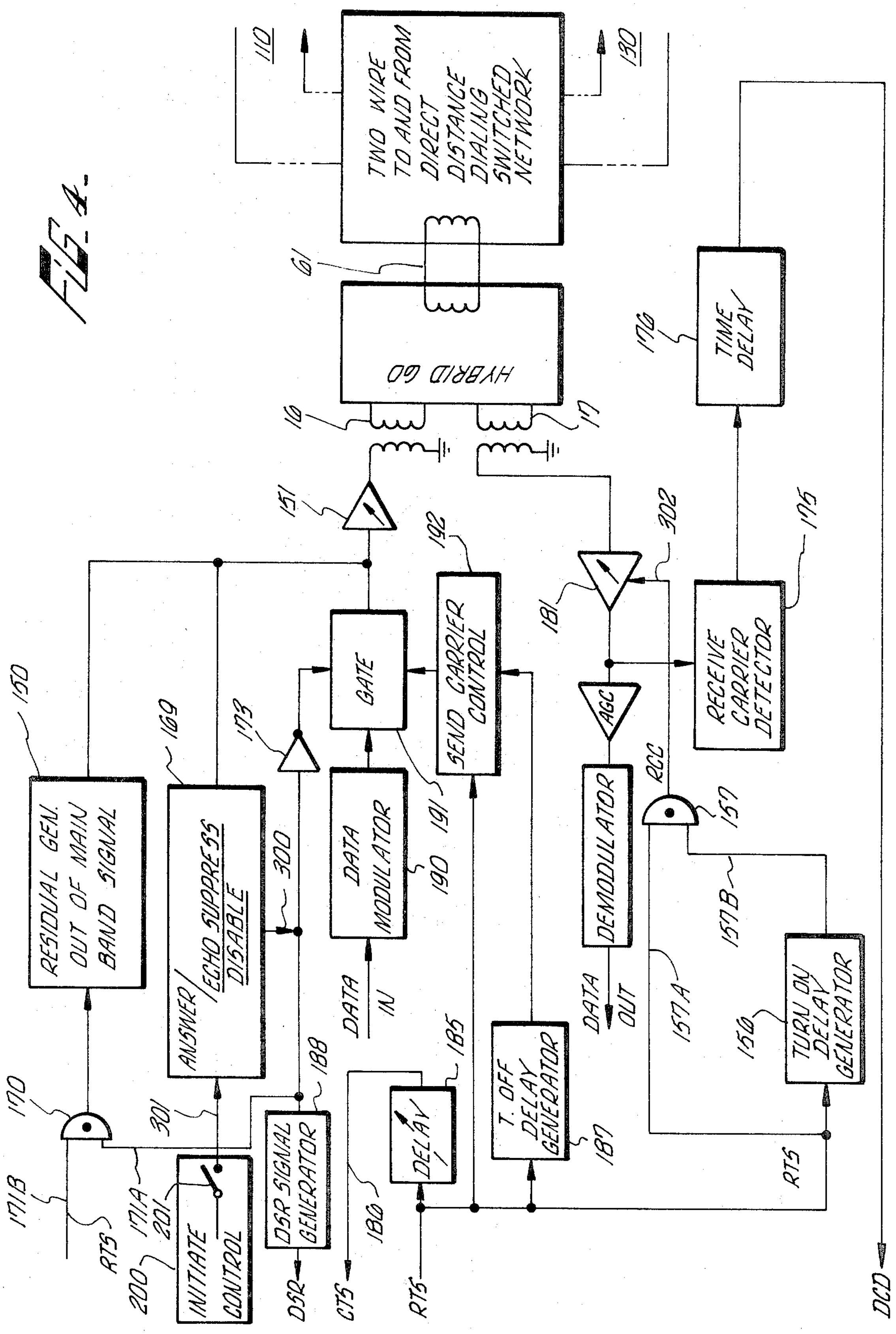
FIG. 4 is a combined block and functional diagram for the modem of FIG. 3.

Turning now to FIG. 4, a schematic and logic diagram of a fast turn-around modem utilizing this invention is depicted. The residual tone generator 150 is connected to a variable gain transmitting amplifier 151 of any well known type. That transmitting amplifier 151 receives as another input an answer/echo suppressor disable tone from the answer tone generator 169. Amplifier 151 also receives a carrier signal through gate 191 (when enabled) which carrier signal may be modulated by data via modulator 190 in any suitable manner.

It is essential, in response to initiate control 200, that answer/echo suppressor disable tone 215 alone be applied from generator 169 to DDD network 100. This single tone, as described earlier, disables all echo suppressors. Accordingly, generator 169 responds to any conventional binary signal which assumes either a logic true or a logic false level, as commanded, for example, by closing or opening switch 201 of initiate control circuit 200. Of course, automatic initiation utilizing any conventional circuitry rather than manual initiation may also be employed. In either event, however, when a command signal on lead 301 is applied to generator 169 by initiate control 200, such an input command will remain at a true level for a predetermined time duration. During that time duration, the answer tone is transmitted from generator 169 over DDD network 100 to the other modem. Generator 169, during the time answer tone 215 is being generated, also includes any conventional circuit for emitting a true output signal. This output control signal applied to lead 300, is inverted by inverter 173 to a false, or inhibit, signal which is applied to transmission gate 191. With gate 191 disabled by the false level from inverter 173, amplifier 151 will not receive any signals from data modulator 190.

During the time that control signal 300 applied through inverter 173 is inhibiting transmission through gate 191, the true level of an output control signal on lead 300 from generator 169 is also applied to NOR gate 170 via lead 171A. Gate 170 is a two input NOR gate whose output is false while any input signal to it is at a logic true level. As shown in FIG. 2 during the transmission of answer tone 215, a true signal is applied at lead 171A to NOR gate 170. Accordingly, residual tone generator 150 is inhibited and does not emit its residual tone 216 while answer tone 215 is being emitted by generator 169. After answer tone 215 ends and at time $T_0$ through $T_1$ of FIG. 2, signal conditions are correct on both input leads 171A and 171B of NOR gate 170 causing its output to assume, and remain at, a true level. A true output signal from gate 170 enables residual tone generator 150 to emit the residual tone 216 until the RTS signal 218 changes to a true level at time $T_1$ as shown in FIG. 2.

An output control signal on lead 300 is also applied to a data set ready (DSR) signal generator 188 shown in FIG. 4. Generator 188 responds to the change from true to false which occurs as the answer tone ceases to be transmitted at time $T_0$, FIG. 2. At this time $T_0$, the DSR signal generator causes the DSR signal 217, FIG. 2, to change from a false to a true level. With modem 25 in a DSR true condition, the associated DTE 20 can raise its RTS signal to a true level at any time after time $T_0$. Even though modem 25 emits a DSR true signal, the receive carrier detector circuit 175 continues to monitor the output of receive amplifier 181 in order to determine if modem 15 is transmitting data to modem 25. Whenever the primary data carrier from modem 15 is received and passed through amplifier 181, it is also applied to a carrier detector 175. The output from carrier detector 175, delayed slightly by delay 176, is emitted to DTE 20 as a control signal known as data carrier detected (DCD). If such an event occurs, DTE 20 is logically implemented in such a manner that it shall not raise its RTS to a true level because modem 25 is already receiving a carrier signal from modem 15.

Assuming that DCD is not true, then DTE 20 can raise its RTS to a true level at any time after time $T_0$. For example, DTE 20 raises RTS 218 to a true level at time $T_1$, FIG. 2. At time $T_1$ the receive amplifier 181 is disabled by an output signal on lead 302 which signal is applied from NOR gate 157, FIG. 4. Thereafter, the receive amplifier 181 is inhibited, and the carrier detector 175 cannot detect any data carrier. DTE 20, through the operation just described seizes modem 25 for a data transmission operation from DTE 20 to DTE 10.

Figure 2:
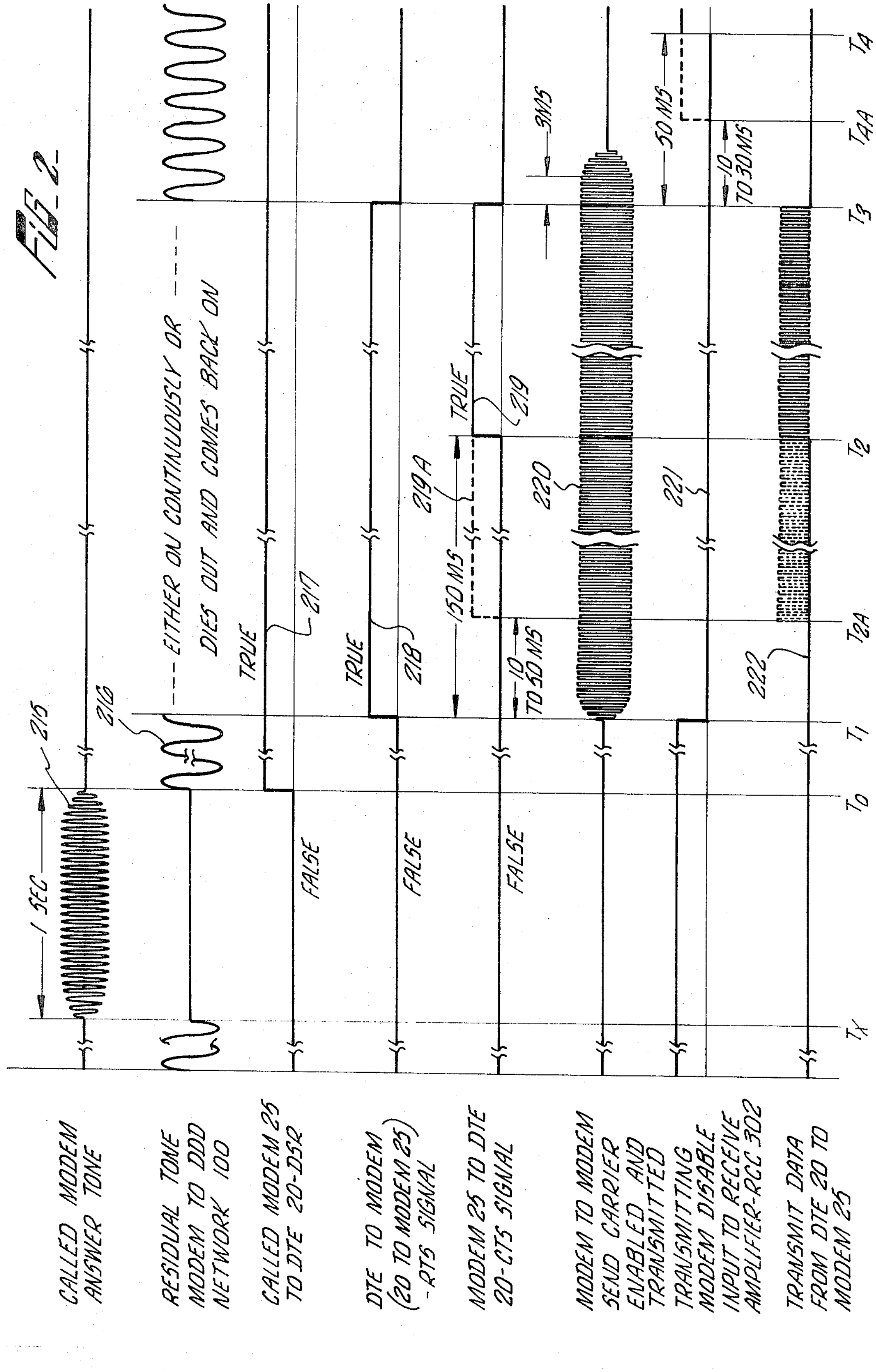
FIG. 2 is a wave form depicting various interface commands between a data terminal equipment and a modem.

In this data transmission mode for modem 25, the RTS signal 218 switches to true level at time $T_1$, FIG. 2. With RTS true, the send carrier control circuit 192 is enabled. Control circuit 192 responds to the RTS true, at time $T_1$, by enabling transmission gate 191. Gate 191, in turn, applies a carrier signal from data modulator 190 to transmit amplifier 151 so as to transmit a carrier over the DDD network 100 via the hybrids and circuitry described earlier. Send carrier 220, FIG. 2, maintains the echo suppressors disabled even if the residual tone 216 ceases to be transmitted after RTS goes true. As mentioned earlier, residual tone 216 need not cease to be transmitted because it is out of the frequency band of the primary data and does not interfere with data modem operations. In point of fact, tone 216 is not intended to be received by any modem and may be applied without any interference with data transmission by either modem.

In any event, however, RTS goes true at time $T_1$ and delay circuit 185 will, after a delay of between 10 to 50 milliseconds, return a CTS signal 219, FIG. 2, as a true level from modem 25 to DTE 20. This delay in CTS signal level changing from a false to a true level is needed to allow the receiving modem 25, FIG. 1, to achieve proper synchronization with a received carrier signal and also to allow time sufficient for any echoes present to die out on the circuit between the two modems.

FIG. 2, depicts the short 10 to 50 milliseconds CTS delay ($D_{cts}$) of this invention in dashed lines as signal 219A. Signal 219 in solid lines depicts the conventional 150 millisecond delay between RTS going true and CTS going true as is used in any conventional modem. In modems utilizing our invention delay circuit 185 delays the change to true level of CTS signal in response to a change to true level of the RTS signal for approximately 10–50 milliseconds. Upon receipt of the true level on the CTS signal line, DTE 20 can and does supply data to data modulator 190 for transmission over DDD network 100 to data modem 15 and its associated DTE.

Also connected to the RTS control signal input lead 179 is an additional delay circuit 187. Reference to FIG. 2, discloses that immediately upon the RTS signal going true, the send carrier 220 is transmitted and the send carrier gate 191 becomes and remains enabled throughout the entire data transmission interval for data modem 25 while the RTS control signal remains at a true level. It should be noted that at the conclusion of a data transmission interval, signal 222, FIG. 2, the send carrier 220 continues to be transmitted beyond time $T_3$ after the last bit of meaningful data is applied to modem 25 from DTE 20 in order to allow this last bit of data to be propagated through the transmitter of modem 25 and applied to the DDD network 100 for transmission to the receiver of modem 15. As is shown in FIG. 2, the RTS signal remains at a true level during the entire time that data is being transmitted. After DTE 20 transmits the last bit of data via modulator 190 of modem 25, the RTS signal 218, FIG. 2 changes to a false level.

The delay circuit 187 has an approximate delay of three milliseconds and delays the change in RTS level from true to false for approximately three milliseconds. Delay circuit 187 thereby maintains the send carrier gate 191 enabled for the additional 3 millisecond duration. Thereafter, gate 191 becomes disabled and the transmission of send carrier 220 ceases as is shown in FIG. 2.

The RTS signal input lead is also connected to NOR gate 157 through lead 157A, FIG. 4. A true level on input 157A (or a true input on lead 157B from Turn On delay generator 156) causes gate 157 to emit a false level on lead 302 from the output of NOR gate 157. The output signal from NOR gate 157, shown as 221, FIG. 2, controls the operation of receive amplifier 181, FIG. 4. While a control signal from NOR gate 157 is at a false level, receiver amplifier 181 is disabled. The RTS signal is also applied to a Turn On delay generator 156 which initiates a time delay $T_3 - T_4$, FIG. 2, in response to a level change on RTS signal line from true to false. The output from generator 156 is connected to NOR gate 157 on input 157B. When RTS changes to a false level, the Turn On delay generator 156 output becomes true for a time duration shown as $T_3$ through $T_4$ in FIG. 2, and in turn the signal 221, FIG. 2, of NOR gate 157 remains false and in turn amplifier 181 remains disabled until after time $T_4$, FIG. 2. Generator 156 in a conventional modem would have a 50 millisecond delay, i.e., the input to the modem receiver is inhibited by amplifier 181 being disabled by signal 221, as shown in FIG. 2 in solid lines, remaining at a false level until approximately 50 milliseconds after the RTS signal level switches from true to false level. Because of the novel operation of our invention, however, the turn on delay time for generator 156 is reduced to be approximately 10 to 30 milliseconds (shown in dashed lines at time $T_{4A}$) as needed for proper operation of a particular modem used. Delay 156 simply assures that modem receive amplifier 181 remains disabled until after the echoes of the previously transmitted signal die out on the circuit between the two modems.

Data communications systems including modems incorporating our invention can transmit data over DDD network 100 with a major improvement in data throughput achieved solely because of the significant reduction in total turn-around time. In our invention, the CTS signal delay circuit 185, FIG. 4, is shown variable to allow the $D_{cts}$ time to vary from approximately 10 to 50 milliseconds depending upon the various factors discussed hereinbefore. In any event $D_{cts}$ in our invention is at least one-third or even a smaller percentage of $D_{cts}$ required for conventional modems when operated over a two wire connection made between two distant points over a DDD network, which network upon random selection contains echo suppressors.

After data transmission is finished and the connection between the two modems through DDD network 100 is disconnected the echo suppressors will automatically become enabled because of removal of signal energy from DDD network 100 for more than 50 milliseconds re-establishes echo suppressors in an enabled condition. Thereafter voice communication resumes without any adverse affects.

It is to be understood that the foregoing features and principles of this invention are merely descriptive, and that many departures and variations thereof are possible by those skilled in the art, without departing from the spirit and scope of this invention.

What is claimed is:

1. A data communication system including data modems operating in a two wire/half duplex mode for data transmission in both directions over a direct distance dialed telephone line network; which network, upon random selection may include echo suppressors that require a finite turn-around time of approximately 150 milliseconds or longer rendering the network incapable of reversing direction of a data transfer until that finite time elapses unless such echo suppressors are first disabled by an echo suppressor disabling tone to remove high attenuation in the network and are thereafter maintained in a disabled state; the improvement comprising:

means at said modems for transmitting data over said network in one direction only at a time over a given frequency bandwidth less than the total bandwidth of an ordinary telephone line;

means associated with a data modem at either end of said network for applying only a unique tone of a given duration and within the data bandwidth for initially disabling all said echo suppressors in said network;

residual network control signal generating means connected to said network and operative during time intervals when the network is free of data transmission in either direction, said generator when enabled emitting a signal selected from a frequency bandwidth free of frequency overlap with said given data frequency bandwidth and within the total telephone line bandwidth;

means responsive to the cessation of the unique echo suppressor disabling tone for enabling said signal generating means after said echo suppressors are disabled for maintaining the echo suppressors disabled during the absence of data transfer in either direction over said network;

means at a modem not receiving data for receiving from an external data terminal equipment a signal requesting a clear-to-send answer signal prior to transmission of data in the given data direction for that modem over said network; and means connected to said signal receiving means for delivering, in an amount of time less than said finite time, a clear-to-send signal to said data terminal equipment.

2. An improvement in accordance with claim 1 and wherein said clear-to-send signal delivering means further comprises:

a signal delay means connected to receive said request-to-send signal and characterized by having a signal delay time of one-third or less than the amount of said finite time.

3. An improvement in accordance with claim 2 wherein said signal delay means further comprises a delay circuit delaying the request-to-send signal for about 10 to 50 milliseconds and thereafter returning the clear-to-send signal to said data terminal equipment.

4. A system in accordance with claim 2 wherein said signal delay means is a variable delay characterized by a delay time ranging from about 10 to 50 milliseconds.

5. An improvement in accordance with claim 1 wherein:

said transmitting means further comprises a data modulator in at least one of said modems, said modulator having a carrier modulated with all data to be transmitted, which data is the only data received by a receiving modem.

6. An improvement as defined by claim 5 wherein said control signal emitted by said generating means is applied only to said direct distance dialed network, said receiving modem receives only said data modulated carrier and is free of any receiving equipment operative in response to said control signal.

7. An improvement in accordance with claim 1 wherein:

control signal generating means is included in at least one of said data modems.

8. An improvement in accordance with claim 7 wherein said control signal is emitted continuously after said echo suppressor disabling means originally disables all echo suppressors in said network.

9. A system in accordance with claim 5 wherein said echo suppressors, once disabled, remain disabled unless signal energy is absent from said direct distance dialed network for a predetermined time; said improvement further comprising:

means enabling said request-to-send signal to be maintained as true level throughout data transmission by said data transmitting means and as a false level at other times;

means enabling said signal generating means immediately after said echo suppressors are disabled; and control means either maintaining said signal generating means enabled continuously during the time request-to-send reqst-to-send signal is true or in the alternative maintaining said signal generating means enabled only when said request-to-send signal is in a false condition whereby the signal energy from said transmitting means represents energy on the network to keep said echo suppressors disabled during the time that said signal generating means is disabled.

10. A data communication system including data modems operating in a two wire/half duplex mode for data transmission in both directions over a direct distance dialed telephone line network; which network, upon random selection may include echo suppressors that require a finite turn-around time of approximately 150 milliseconds rendering the network incapable of reversing direction of a data transfer until that finite time elapses unless such echo suppressors are disabled by an echo suppressor disabling tone to remove high attenuation from the network; the improvement comprising:

means for transmitting data over said network in one direction only at a time over a given frequency band less than the total bandwidth of an ordinary telephone line;

control signal generating means connected to said network and responsive to the cessation of the echo suppressor disabling tone for passing a network control signal over said network after cessation of the suppressor disabling tone and during time intervals when the network is free of data transmission in either direction, said signal characterized in that it is selected from a frequency band free of frequency overlap with said given data frequency band and within the total telephone line bandwidth and it is unintelligible to any modem receiver;

means at a modem not receiving data for receiving from an external data terminal equipment a signal requesting a clear-to-send answer signal prior to transmission of data in the given data direction for that modem over said netowrk; and means connected to said signal receiving means for delivering, in an amount of time less than said finite time, a clear-to-send signal to said data terminal equipment.

11. An improvement in accordance with claim 10 and wherein said clear-to-send signal delivering means further comprises:

a signal delay means connected to receive said request-to-send signal and characterized by having a signal delay time of one-third or less than the amount of said finite time.

12. An improvement in accordance with claim 11 wherein said signal delay means further comprises a delay circuit delaying the request-to-send signal for about 10 to 50 milliseconds and thereafter returning the clear-to-send signal to said data terminal equipment.

13. A system in accordance with claim 11 wherein said signal delay means is a variable delay characterized by a delay time ranging from about 10 to 50 milliseconds.

14. An improvement in accordance with claim 10 wherein:

said transmitting means further comprises a data modulator in at least one of said modems, said modulator having a carrier modulated with all data to be transmitted, which data is the only data received by a receiving modem.

15. An improvement as defined by claim 5 wherein said control signal emitted by said generating means is applied only to said direct distance dialed network, said receiving modem receives only said data modulated carrier and is free of any receiving equipment operative in response to said control signal.

16. An improvement in accordance with claim 10 wherein:

control signal generating means is included in at least one of said data modems.

17. An improvement in accordance with claim 7 wherein said control signal is emitted immediately and continuously after cessation of said echo suppressor disabling tone has disabled all echo suppressors in said network.

18. A system in accordance with claim 14 wherein said echo suppressors, once disabled, remain disabled unless signal energy is absent from said direct distance dialed network for a predetermined time; said improvement further comprising:

means enabling said request-to-send signal to be maintained as true level throughout data transmission by said data transmitting means and as a false level at other times;

means enabling said control signal generating means immediately after said echo suppressors are disabled; and control means either maintaining said control signal generating means enabled continuously during the time the request-to-send signal is true or in the alternative maintaining said control signal generating means enabled only when said request-to-send signal is in a false condition whereby the signal energy from said data transmitting means represents energy on the network to keep said echo suppressors disabled during the time that said control signal generating means is disabled.

* * * * *